(12) United States Patent
Quayle et al.

(10) Patent No.: US 8,133,306 B2
(45) Date of Patent: Mar. 13, 2012

(54) GAS DIFFUSION SUBSTRATE

(75) Inventors: George Thomas Quayle, Cumbria (GB);
Julia Margaret Rowe, Oxon (GB);
Jonathan David Brereton Sharman,
Oxon (GB); Julian Andrew Siodlak,
Cumbria (GB); Nigel Julian Walker,
Cumbria (GB); **Andrew James
Fletcher**, Wadebridge (GB)

(73) Assignees: **Johnson Matthey Public Limited
Company, London (GB); Technical
Fibre Products Limited**, Cumbria (GB)

( * ) Notice: Subject to any disclaimer, the term of this patent is extended or adjusted under 35 U.S.C. 154(b) by 894 days.

(21) Appl. No.: 11/629,809

(22) PCT Filed: Jun. 15, 2005

(86) PCT No.: PCT/GB2005/002371
§ 371 (c)(1),
(2), (4) Date: Jul. 3, 2008

(87) PCT Pub. No.: WO2005/124902
PCT Pub. Date: Dec. 29, 2008

(65) Prior Publication Data
US 2008/0268297 A1    Oct. 30, 2008

(30) Foreign Application Priority Data
Jun. 15, 2004    (GB) .................................. 0413324.5

(51) Int. Cl.
*B01D 53/22* (2006.01)
*H01M 8/10* (2006.01)
*H01M 4/88* (2006.01)
*H01M 4/96* (2006.01)

(52) U.S. Cl. ............... 96/4; 96/11; 96/12; 96/13; 95/45;
95/54; 55/524; 429/513; 429/532; 429/534;
429/535; 429/209; 264/29.1; 264/29.5; 264/212;
204/283; 204/294; 423/447.2; 427/115

(58) Field of Classification Search ................. 96/4, 11,
96/12, 13, 14; 95/45, 50, 54; 55/524, DIG. 5;
429/513, 514, 532, 534, 535, 209; 264/29.1,
264/29.2, 29.5, 212; 204/283, 294; 423/442,
423/447.2; 427/115
See application file for complete search history.

(56) References Cited

U.S. PATENT DOCUMENTS
5,424,161 A * 6/1995 Hayashi et al. ............ 430/108.3
(Continued)

FOREIGN PATENT DOCUMENTS
EP    0 791 974 A1    8/1997
(Continued)

*Primary Examiner* — Jason M Greene
(74) *Attorney, Agent, or Firm* — RatnerPrestia

(57) ABSTRACT

A gas diffusion substrate includes a non-woven network of carbon fibres, the carbon fibres are graphitised but the non-woven network has not been subjected to a graphitisation process. A mixture of graphitic particles and hydrophobic polymer is disposed within the network. The longest dimension of at least 90% of the graphitic particles is less than 100 μm. A process for manufacturing gas diffusion substrates includes depositing a slurry of graphitised carbon fibres onto a porous bed forming a wet fibre network, preparing a suspension of graphitic particles and hydrophobic polymer, applying onto, and pulling the suspension into, the network, and drying and firing the network. Another process includes mixing a first slurry of graphitic particles and hydrophobic polymer with a second slurry of graphitised carbon fibres and liquid forming a third slurry, depositing the third slurry onto a porous bed forming a fibre-containing layer, and drying and firing the layer.

34 Claims, 1 Drawing Sheet

U.S. PATENT DOCUMENTS

Figure 1:
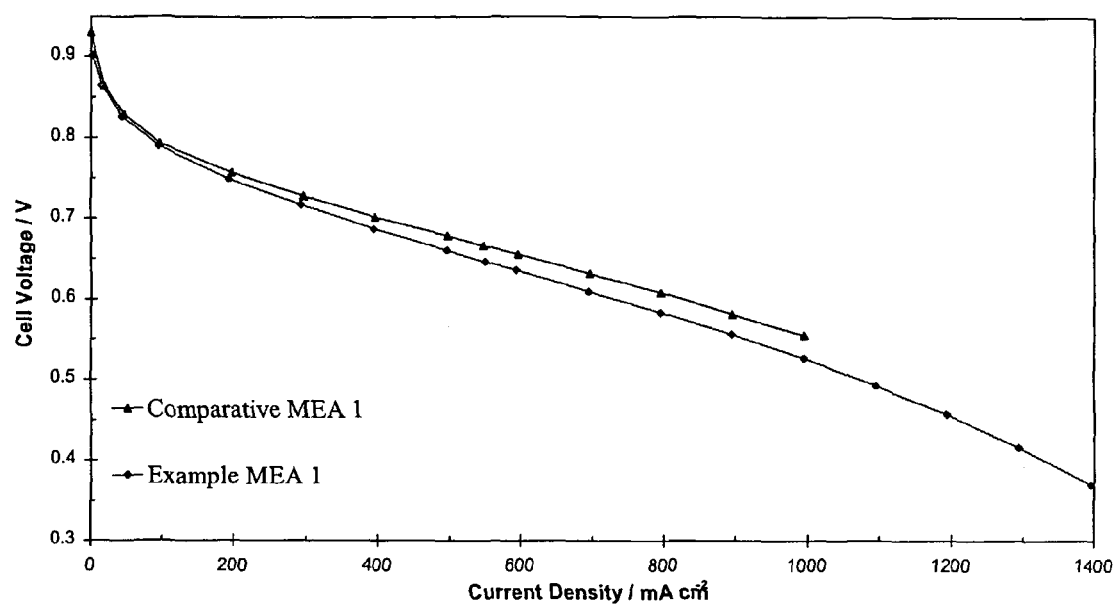

| | | | |
|---|---|---|---|
| 5,578,255 A * | 11/1996 | Okuyama et al. | 264/29.5 |
| 5,702,839 A * | 12/1997 | Frost et al. | 429/492 |
| 6,511,768 B1 * | 1/2003 | Trapp et al. | 429/437 |
| 7,326,488 B2 * | 2/2008 | Hayashi et al. | 429/529 |
| 2002/0058180 A1 * | 5/2002 | Beattie et al. | 429/44 |
| 2003/0087061 A1 * | 5/2003 | Tashiro | 428/141 |
| 2005/0136356 A1 * | 6/2005 | Van Damme et al. | 430/270.1 |
| 2006/0214104 A1 * | 9/2006 | Pope et al. | 250/297 |
| 2007/0259244 A1 * | 11/2007 | Araki et al. | 429/34 |

FOREIGN PATENT DOCUMENTS

| | | |
|---|---|---|
| EP | 0 875 524 A2 | 11/1998 |
| EP | 1 369 528 A1 | 12/2003 |
| GB | 2 185 247 A | 7/1987 |
| JP | 62-232860 | 10/1987 |
| WO | WO-98/27606 A1 | 6/1998 |
| WO | WO-00/55933 A1 | 9/2000 |
| WO | WO-01/80342 A1 | 10/2001 |
| WO | WO-02/39526 A1 | 5/2002 |

* cited by examiner

GAS DIFFUSION SUBSTRATE

This application is the U.S. National Phase application of PCT International Application No. PCT/GB2005/002371, filed Jun. 15, 2005, and claims priority of British Patent Application No. 0413324.5, filed Jun. 15, 2004.

FIELD OF THE INVENTION

The present invention relates to gas diffusion substrates, particularly to gas diffusion substrates that are used in fuel cells such as polymer electrolyte membrane fuel cells. The invention further relates to processes for manufacturing gas diffusion substrates.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Fuel cells are a clean and efficient power source, and may replace traditional power sources such as the internal combustion engine in both stationary and automotive power applications. In a proton exchange membrane (PEM) fuel cell, the electrolyte is a solid polymeric membrane which is electronically insulating but ionically-conducting.

The principle component of a polymer electrolyte fuel cell is known as a membrane electrode assembly (MEA) and is essentially composed of five layers. The central layer is the polymer membrane. On either side of the membrane there is an electrocatalyst layer, typically comprising a platinum-based electrocatalyst. An electrocatalyst is a catalyst that promotes the rate of an electrochemical reaction. Finally, adjacent to each electrocatalyst layer there is a gas diffusion substrate. The gas diffusion substrate must allow the reactants to reach the electrocatalyst layer and must conduct the electric current that is generated by the electrochemical reactions. Therefore the substrate must be porous and electrically conducting.

The MEAs can be constructed by several methods. The electrocatalyst layer may be applied to the gas diffusion substrate to form a gas diffusion electrode. Two gas diffusion electrodes can be placed either side of a membrane and laminated together to form the five-layer MEA. Alternatively, the electrocatalyst layer may be applied to both faces of the membrane to form a catalyst coated membrane. Subsequently, gas diffusion substrates are applied to both faces of the catalyst coated membrane. Finally, an MEA can be formed from a membrane coated on one side with an electrocatalyst layer, a gas diffusion substrate adjacent to that electrocatalyst layer, and a gas diffusion electrode on the other side of the membrane.

Typical gas diffusion substrates include substrates based on carbon paper (e.g. Toray® paper available from Toray Industries, Japan), woven carbon cloths (e.g. Zoltek® PWB-3 available from Zoltek Corporation, USA) or non-woven carbon fibre webs (e.g. Optimat 203 available from Technical Fibre Products, UK). The carbon substrate is typically modified with a particulate material either embedded within the substrate or coated onto the planar faces, or a combination of both. The particulate material is typically a mixture of carbon black and a polymer such as polytetrafluoroethylene (PTFE).

U.S. Pat. No. 6,511,768 discloses a gas diffusion substrate comprising a graphitised fibre web structure. The web is manufactured by taking a web structure made from polyacrylonitrile (PAN) fibres, and oxidising and graphitising the web. The graphitisation step is carried out at temperatures from 1500 to 2500° C. A high temperature treatment of this kind requires significant energy input, which adds to the cost of the manufacturing process.

EP 791 974 discloses a continuous manufacturing method for preparing gas diffusion substrates that does not use a high temperature graphitisation step. Carbon black is mixed with PTFE, and carbon fibres are coated with PTFE. The carbon black/PTFE mixture and the coated carbon fibres are mixed to form a slurry which is deposited onto a moving mesh bed. The deposited layer is dried, forming a gas diffusion substrate.

SUMMARY OF THE INVENTION

The present inventors have sought to provide a gas diffusion substrate material that has improved conductivity when compared to the substrates disclosed in EP 791 974 and have sought to achieve this by a process that does not require the high temperature graphitisation of a fibre web. The substrate must have suitable conductivity, air permeability and water-handling properties for use in a fuel cell. The substrate should be sufficiently strong and flexible to withstand further processing into electrodes and/or membrane electrode assemblies.

Accordingly the present invention provides a gas diffusion substrate comprising a non-woven network of carbon fibres wherein the carbon fibres are graphitised but the non-woven network has not been subjected to a graphitisation process; and a mixture of graphitic particles and hydrophobic polymer disposed within the network, wherein the longest dimension of at least 90% of the graphitic particles is less than 100 μm.

DETAILED DESCRIPTION OF THE INVENTION

Graphitisation is a process wherein carbon is heated to at least 1500° C. and the crystallographic structure of the carbon changes to the "graphitic" form that is more like the structure of pure graphite. A non-woven network of carbon fibres wherein the carbon fibres are graphitised but the non-woven network has not been subjected to a graphitisation process is physically different to a network that has been graphitised. A graphitised network is likely to have higher conductivity and higher stiffness than a non-graphitised network made of graphitised carbon fibres.

U.S. Pat. No. 6,511,768 states that forming web structures from graphitised fibres is prevented by the high stiffness of the fibres, but the present inventors have found that graphitised fibres are advantageously used to form the non-woven network of fibres in the gas diffusion substrate of the present invention. It is preferable to use individual graphitised fibres rather than graphitising a fibre network because it is easier and more economical to treat the individual fibres. Graphitising a fibre network can also lead to undesirable non-flat structures because of anisotropic dimensional change during the graphitisation process.

U.S. Pat. No. 6,511,768 discloses that graphitised web structures should be used to form gas diffusion substrates because they have high through-plane conductivity. The present inventors have found that a gas diffusion substrate with high conductivity can be achieved without using a graphitised web structure. In the present invention, high conductivity is achieved by disposing fine graphitic particles within the non-woven network of graphitised carbon fibres. The fine graphitic particles (the longest dimension of at least 90% of the graphitic particles is less than 100 μm) provide an alternative parallel conduction pathway to the fibres and help bridge adjacent fibres, thus improving inter-fibre conductivity.

The graphitised carbon fibres are suitably carbon fibres made by oxidising and graphitising polyacrylonitrile (PAN) fibres. Suitably, the average diameter of the carbon fibres is from 0.1-20 μm, preferably from 1-10 μm. The average length of the carbon fibres is suitably from 1-20 mm, preferably from 3-12 mm. The non-woven network suitably has a grammage (areal weight) of between 10-50 g/m$^2$, preferably between 20-40 g/m$^2$ (this is the weight of the carbon fibres only and does not include the weight of the graphitic particles or hydrophobic polymer). If the fibre network has a grammage lower than this, the conductivity of the substrate may be compromised.

In the non-woven network the carbon fibres are suitably randomly orientated in the x- and y-directions (in-plane), producing a two-dimensional isotropic structure. However, it is possible that some orientation in the x- and y-directions may be introduced depending on the method used to produce the fibre network. There is likely to be random orientation in the z-direction (through-plane) if the fibre network is laid down using conventional paper-making or wet-laid non-woven techniques.

The graphitic particles used in the invention may be graphitised carbon blacks, but are suitably flake graphite or spherical graphite. The longest dimension of at least 90% of the graphitic particles is less than 100 μm, suitably between 20 and 0.1 μm, preferably between 5 and 0.1 μm. Fine and very fine graphitic particles are preferred; larger particles may be difficult to retain within the fibre network. Preferably the graphitic particles are supplied as colloidal suspensions of graphitic particles, wherein the graphitic particles are small enough to be held in colloidal suspension. Colloidal suspensions of graphitic particles are advantageous because the small particles do not agglomerate.

The hydrophobic polymer is suitably a fluoropolymer such as polytetrafluoroethylene (PTFE) or fluorinated ethylene-propylene (FEP), and is preferably PTFE. The weight ratio of graphitic particles to hydrophobic polymer is suitably between 50:1 and 2:1, preferably between 10:1 and 4:1. The weight ratio of graphitic particles to carbon fibres is suitably between 1:2 and 10:1, preferably between 3:5 and 5:1. The relative amounts of graphitic particles, hydrophobic polymer and carbon fibres are very important in determining the properties of the substrate. Increasing the proportion of hydrophobic polymer increases the hydrophobicity of the substrate and increases the strength, whilst increasing the proportions of carbon fibres and graphitic particles increases the conductivity. Because the graphitic particles have very low resistivity, the relative amount of the graphitic particles has the most significant effect on conductivity.

In one embodiment of the invention there is a gradient in the concentration of the graphitic particles and hydrophobic polymer across the thickness of the fibre network. The expression "gradient in concentration" means that the concentration varies in a gradual (although not necessarily linear) manner from a first face of the network to the second face. Suitably the amount of graphitic particles and hydrophobic polymer at a first face is at least 2 times, and preferably at least 4 times the amount of graphitic particles and hydrophobic polymer at a second face.

In an alternative embodiment of the invention, the graphitic particles and hydrophobic polymer are homogeneously disposed within the fibre network, i.e. there is no gradient in concentration across the thickness of the fibre network.

In addition to the graphitic particles and the hydrophobic polymer, the gas diffusion substrate may further comprise a binder produced by the rapid low temperature carbonisation of a phenolic resin. This increases the strength of the substrate in the x-y plane as it fixes the nodes of the web structure and binds in the graphitic particles more closely. Furthermore, it also decreases the compressibility of the material. The amount of carbonised phenolic resin binder is suitably 2-50 wt %, based on the weight of the substrate. Carbonisation can be achieved at temperatures of around 800° C., in contrast to graphitisation which is carried out above 1500° C., although lower temperatures can be used with a concomitantly lower increase in conductivity.

In a preferred embodiment of the invention the gas diffusion substrate is suitable for use in a fuel cell, and thus has an ex-situ thickness of less than 400 μm, and preferably a thickness between 100 and 250 μm. The thickness of the substrate is likely to vary substantially with compression, such as will occur when assembled into a fuel cell stack.

Suitably, when the substrate is used in a fuel cell, a base layer of carbon black and hydrophobic polymer is present on at least one face of the substrate. The particulate carbon black material is, for example, an oil furnace black such as Vulcan® XC72R (from Cabot Chemicals, USA) or an acetylene black such as Shawinigan (from Chevron Chemicals, USA) or Denka FX-35 (from Denka, Japan). The hydrophobic polymer is suitably polytetrafluoroethylene (PTFE). The base layer provides a continuous surface on which to apply a catalyst layer. If the gas diffusion substrate has a gradient in the concentration of graphitic particles and hydrophobic polymer across the thickness of the substrate, then a base layer is suitably present on the face of the gas diffusion substrate wherein there is a higher concentration of graphitic particles and hydrophobic polymer.

The present invention further provides a gas diffusion electrode comprising a gas diffusion substrate according to the invention and an electrocatalyst layer.

The electrocatalyst layer comprises an electrocatalyst which may be a finely divided metal powder (metal black), or may be a supported catalyst wherein small metal particles are dispersed on electrically conducting particulate carbon supports. The electrocatalyst metal is suitably selected from
(i) the platinum group metals (platinum, palladium, rhodium, ruthenium, iridium and osmium),
(ii) gold or silver,
(iii) a base metal,
or an alloy or mixture comprising one or more of these metals or their oxides. The preferred electrocatalyst metal is platinum, which may be alloyed with other precious metals such as ruthenium or base metals such as molybdenum or tungsten. If the electrocatalyst is a supported catalyst, the loading of metal particles on the carbon support material is suitably in the range 10-90 wt %, preferably 15-75 wt %.

The electrocatalyst layer suitably further comprises ion-conducting polymer, which is included to improve the ionic conductivity within the layer.

In a preferred embodiment wherein the gas diffusion electrode is a cathode of a fuel cell and wherein there is a gradient of concentration of graphitic particles and hydrophobic polymer across the thickness of the fibre network, the electrocatalyst layer is adjacent to the face of the gas diffusion substrate wherein there is a higher concentration of graphitic particles and hydrophobic polymer. Positioning the most hydrophobic surface of the substrate adjacent to the catalyst layer prevents the catalyst layer from becoming blocked with water during fuel cell operation.

The present invention further provides a membrane electrode assembly comprising a gas diffusion substrate according to the invention. The membrane electrode assembly comprises a polymer electrolyte membrane interposed between two electrocatalyst layers. Gas diffusion substrates, at least one of which is a gas diffusion substrate according to the invention, are adjacent to the electrocatalyst layers.

The polymer electrolyte membrane may be any type of ion-conducting membrane known to those skilled in the art. Suitably the membrane is proton-conducting. In state of the art membrane electrode assemblies, the membranes are often based on perfluorinated sulphonic acid materials such as Nafion® (DuPont), Flemion® (Asahi Glass) and Aciplex® (Asahi Kasei). The membrane may be a composite membrane, containing the proton-conducting material and other materials that confer properties such as mechanical strength. For example, the membrane may comprise a proton-conducting membrane and a matrix of silica fibres, as described in EP 875 524. The membrane is suitably less than 200 μm thick, preferably less than 50 μm thick.

In a preferred embodiment wherein there is a gradient of concentration of graphitic particles and hydrophobic polymer across the thickness of the fibre network, an electrocatalyst layer in the membrane electrode assembly is adjacent to the face of the gas diffusion substrate wherein there is a higher concentration of graphitic particles and hydrophobic polymer.

The present invention further provides a process for forming a gas diffusion substrate according to the invention comprising the steps of:
  a) depositing a slurry of graphitised carbon fibres onto a porous bed to form a wet fibre network;
  b) preparing a suspension of graphitic particles and hydrophobic polymer, wherein the longest dimension of at least 90% of the graphitic particles is less than 100 μm;
  c) applying the suspension onto the wet fibre network;
  d) pulling the suspension into the wet fibre network; and
  e) drying and firing the wet fibre network at a temperature that does not exceed 1000° C.

The process does not require a separate step wherein a dry fibre web is pre-formed and does not require a high temperature graphitisation treatment, i.e. there is no requirement to heat at more than 1500° C.

The slurry of fibres suitably comprises graphitised carbon fibres in a liquid such as water. The slurry can be prepared by mixing the fibres and the water by mechanical or manual stirring. The slurry is deposited onto a porous bed such as a paper-making wire or forming fabric. The slurry may be deposited using a number of techniques suitable for forming wet-laid non-woven webs, e.g. using a curtain-coater or a weir coater, providing an even, thin layer of slurry.

The fibre slurry suitably contains a binder material such as polyvinyl alcohol (PVA), typically in the range 5-15% of the total dry mass of the slurry. The fibre slurry suitably contains a viscosity modifier such as Texipol®, typically 0.5-1% of the total volume of the slurry. In one embodiment, the fibre slurry further contains a phenolic resin.

As the slurry is deposited onto the porous bed, a wet fibre network is formed. The wet fibre network is supported by the bed and would collapse if removed from the bed.

The longest dimension of at least 90% of the graphitic particles is less than 100 μm, and preferably the longest dimension of at least 90% of the graphitic particles is in the range 0.1-5 μm. Fine graphitic particles (0.1-100 μm) are preferred as they can be added to the fibre network via filtration process; larger particles will not penetrate into the structure. Preferably the graphitic particles are supplied as a colloidal suspension of graphitic particles, e.g. a colloidal solution of graphite particles.

The suspension of graphitic particles and hydrophobic polymer suitably comprises 1-10 wt % solids in water. The suspension may be prepared by mixing a suspension of graphitic particles, a suspension of the hydrophobic polymer and water by mechanical or manual stirring.

The suspension is suitably applied to the wet fibre network via a weir or curtain coater.

The suspension is pulled into the wet fibre network suitably using a suction system. In a preferred embodiment of the invention, the suspension is applied to one face of the wet fibre network only, and the suction is applied to the other face of the wet fibre network. The suspension is pulled into the fibre network, but generally more of the suspension remains near the face of the substrate where the suspension is applied than reaches the face of the substrate where the suction is applied. Therefore, this process can be used to manufacture gas diffusion substrates where there is a gradient of porosity across the thickness of the substrate.

The wet fibre network is dried and fired at a temperature that does not exceed 1000° C. and that suitably does not exceed 400° C. This is preferable to many prior art processes wherein a high temperature graphitisation step is required. Preferably the firing temperature is sufficient to sinter the hydrophobic polymer and to fix any binder in the fibre network, and is at least 270° C. If a phenolic binder has been added to the fibre slurry, the firing must be carried out at between 750 and 950° C., if it is desired to fully carbonise the binder.

The present invention further provides an alternative process for preparing a gas diffusion substrate according to the invention comprising the steps of:
  a) mixing graphitic particles, wherein the longest dimension of at least 90% of the graphitic particles is less than 100 μm, with a suspension of hydrophobic polymer to form a first slurry;
  b) mixing graphitised carbon fibres, a liquid and optionally a binder to form a second slurry;
  c) mixing the first slurry with the second slurry to form a third slurry;
  d) depositing the third slurry onto a porous bed to form a fibre-containing layer; and
  e) drying and firing the fibre-containing layer at a temperature that does not exceed 1000° C.

In this process, graphitic particles are successfully incorporated into a carbon fibre web, providing a highly conductive gas diffusion substrate in a simple "one-pot" process, without the need for a high temperature graphitisation treatment. The pre-mixing of the graphitic particles with the hydrophobic polymer suspension ensures that the graphitic particles are retained in the gas diffusion substrate.

The suspension of hydrophobic polymer is suitably aqueous and may comprise additional components such as surfactants. The solid content of the suspension is suitably between 0.01 wt % and 1 wt %. The graphitic particles are suitably mixed with the hydrophobic polymer suspension using a mixer such as a high shear mixer. The weight ratio of graphitic particles to hydrophobic polymer is suitably between 50:1 and 2:1, preferably between 10:1 and 4:1. The inventors have found that the ratio of graphitic particles to hydrophobic polymer affects the level of retention of the graphitic particles in the gas diffusion substrate.

A preferred binder for the second slurry is polyvinyl alcohol (PVA). The liquid is preferably water. The ratio of binder to fibres is suitably between 1:1 and 1:20 and the solid content of the second slurry is suitably less than 1 wt %. The fibres, optionally a binder and the liquid are mixed using a mixer such as a high shear mixer. In one embodiment, a phenolic resin may be added to the second slurry.

The first slurry and the second slurry are mixed together, suitably using a high shear mixer. It is not possible to mix the graphitic particles, hydrophobic polymer and graphitised carbon fibres in a single step; pro-mixing of the graphitic particles and hydrophobic polymer is needed, otherwise the graphitic particles are not retained in the gas diffusion substrate.

The third slurry is deposited onto a porous bed which is preferably a paper-making wire or forming fabric. The third slurry may be deposited using a number of techniques, but is suitably deposited using a weir-coater. As the third slurry is deposited onto the bed, a fibre-containing layer is formed. The fibres form a network within the layer, and the graphitic particles and hydrophobic polymer are embedded within the fibre to network. The concentration of the graphitic particles and hydrophobic polymer is substantially uniform across the thickness of the fibre-containing layer.

The fibre-containing layer is dried and fired at a temperature that does not exceed 400° C. and that suitably does not exceed 350° C. This is preferable to many prior art processes wherein a high temperature graphitisation step is required. Preferably the firing temperature is sufficient to sinter the hydrophobic polymer and to fix any binder in the fibre network, and is at least 270° C. If a phenolic binder has been added to the second slurry, the firing must be carried out at between 750 and 950° C. to carbonise the binder.

The processes of the present invention may comprise a further step of applying a layer comprising carbon black and a hydrophobic polymer to at least one face of the fibre-containing layer.

The present invention further provides a process for producing a gas diffusion electrode wherein a gas diffusion substrate is produced by a process according to the invention and an electrocatalyst layer is deposited onto the gas diffusion substrate. The electrocatalyst layer is deposited using coating methods known to those skilled in the art such as printing, spraying or doctor blade methods.

EXAMPLES

The invention will now be described by reference to examples that are illustrative and not limiting of the invention.

Example 1

Gas Diffusion Substrate

A fibre slurry containing 75 wt % (based on the weight of the solid components) SGL C30 6 mm carbon fibres (graphitised PAN) and 25 wt % SGL C30 3 mm carbon fibres (graphitised PAN) was prepared by adding the fibres to water and stirring. A PVA binder (Solvron NL2003) (10% by slurry dry weight) and a Texipol® 63-002 viscosity modifier (0.8% by slurry volume) were added. The fibre slurry was deposited onto a paper-making wire using a weir coater to form a wet non-woven fibre network.

A graphite/PTFE slurry was prepared by mixing a graphite suspension (AquaDag 18%, Acheson) and a PTFE suspension (Fluon GP1 solution, Asahi Glass) in a 4:1 ratio. The slurry was applied to the wet fibre network using a curtain coater and was pulled into the fibre network using a suction system. The wet substrate was dried and fired at 385° C. for 15 minutes.

Example 2

Gas Diffusion Substrate

A fibre slurry containing SGL C30 6 mm carbon fibres (graphitised PAN) was prepared by adding the fibres to water and stirring. A PVA binder (Solvron NL2003) (15% by slurry dry weight) and a Texipol® 63-002 viscosity modifier (0.6% by slurry volume) were added.

A second slurry, containing graphite particles and PTFE, was prepared by mixing Timcal graphite flakes (T44) and a PTFE suspension (Fluon GP1 solution, Asahi Glass) (6% by dry weight) in water.

The two slurries were then mixed together in a forming tank and the fibre slurry was deposited onto a paper-making wire using a weir coater to form a wet non woven fibre network interspersed with graphite particles.

The wet substrate was dried and fired at 385° C. for 15 minutes.

Example 3

Membrane Electrode Assembly

Example MEA 1 was prepared using two gas diffusion substrates produced according to Example 1. Carbon/PTFE base layers were applied to one surface of each gas diffusion substrate. The gas diffusion substrates were positioned either side of a catalysed perfluorinated sulphonic acid membrane, with the base layers facing the membrane, and the assembly was laminated together. Comparative MEA 1 was prepared in exactly the same way except that the gas diffusion substrates were Toray®TGP-H-060 paper of approximately the same thickness as the gas diffusion substrates according to Example 1.

Both MEAs were tested in a fuel cell at 65° C. with 14.9 kPa hydrogen pressure and 14.9 kPa air pressure. FIG. 1 shows that the performance of Example MEA 1 was comparable to the performance of Comparative MEA 1.

The invention claimed is:

1. A gas diffusion substrate comprising
    a non-woven network of carbon fibres wherein the carbon fibres are graphitised but the non-woven network has not been subjected to a graphitisation process; and
    a mixture of graphitic particles and hydrophobic polymer disposed within the network, wherein the longest dimension of at least 90% of the graphitic particles is between 20 and 0.1 µm.

2. A gas diffusion substrate according to claim 1, wherein the non-woven network has a grammage of between 10-50 g/m².

3. A gas diffusion substrate according to claim 1, wherein the graphitic particles are small enough to be held in colloidal suspension.

4. A gas diffusion substrate according to claim 1, wherein the weight ratio of graphitic particles to hydrophobic polymer is between 50:1 and 2:1.

5. A gas diffusion substrate according to claim 1, wherein the weight ratio of graphitic particles to carbon fibres is between 1:2 and 10:1.

6. A gas diffusion substrate according to claim 1, wherein the substrate has a gradient in the concentration of the graphitic particles and hydrophobic polymer across the thickness of the non-woven network.

7. A gas diffusion substrate according to claim 1, wherein the graphitic particles and hydrophobic polymer are homogeneously disposed within the fibre network.

8. A gas diffusion substrate according to claim 1, comprising a carbonised phenolic resin binder.

9. A gas diffusion substrate according to claim 1, wherein a base layer of carbon black and hydrophobic polymer is present on at least one face of the substrate.

10. A gas diffusion electrode comprising a gas diffusion substrate according to claim 1 and an electrocatalyst layer.

11. A gas diffusion electrode according to claim 10, wherein the substrate has a gradient in the concentration of the graphitic particles and hydrophobic polymer across the thickness of the non-woven network, wherein the electrocatalyst layer is adjacent to the face of the gas diffusion substrate and wherein there is a higher concentration of graphitic particles and hydrophobic polymer.

12. A membrane electrode assembly comprising a gas diffusion substrate according to claim 1.

13. A membrane electrode assembly comprising a gas diffusion electrode according to claim 10.

14. A process for preparing a gas diffusion comprising the steps of:
   a) depositing a slurry of graphitised carbon fibres onto a porous bed to form a wet fibre network;
   b) preparing a suspension of graphitic particles and hydrophobic polymer, wherein the longest dimension of at least 90% of the graphitic particles is between 20 and 0.1 µm;
   c) applying the suspension onto the wet fibre network;
   d) pulling the suspension into the wet fibre network; and
   e) drying and firing the wet fibre network at a temperature that does not exceed 1000° C.;
wherein the gas diffusion substrate is according to claim 1.

15. A process according to claim 14, wherein in step (d) the suspension is pulled into the wet fibre network using a suction system.

16. A process according to claim 15, wherein the suspension is applied to one face of the wet fibre network only, and the suction is applied to the other face of the wet fibre network.

17. A process for preparing a gas diffusion substrate comprising the steps of:
   a) mixing graphitic particles, wherein the longest dimension of at least 90% of the graphitic particles is between 20 and 0.1 µm, with a suspension of hydrophobic polymer to form a first slurry;
   b) mixing graphitised carbon fibres and a liquid to form a second slurry;
   c) mixing the first slurry with the second slurry to form a third slurry;
   d) depositing the third slurry onto a porous bed to form a fibre-containing layer; and
   e) drying and firing the fibre-containing layer at a temperature that does not exceed 1000° C.;
wherein the gas diffusion substrate is according to claim 1.

18. A process for preparing a gas diffusion substrate according to claim 14, comprising a further step of applying a layer comprising carbon black and a hydrophobic polymer to at least one face of the fibre-containing layer.

19. A process for producing a gas diffusion electrode wherein a gas diffusion substrate is produced by a process according to claim 14 and an electrocatalyst layer is deposited onto the gas diffusion substrate.

20. The process of claim 17 wherein step (b) further comprises mixing a binder with the carbon fibres and the liquid.

21. A gas diffusion substrate comprising:
   a non-woven network of carbon fibres wherein the carbon fibres are graphitised but the non-woven network has not been subjected to a graphitisation process; and
   a mixture of graphitic particles and hydrophobic polymer disposed within the network, wherein the longest dimension of at least 90% of the graphitic particles is between 100 µm.
   wherein the weight ratio of graphitic particles to hydrophobic polymer is between 50:1 and 2:1.

22. A gas diffusion substrate according to claim 21, wherein the non-woven network has a grammage of between 10-50 g/m$^2$.

23. A gas diffusion substrate according to claim 21, wherein the graphitic particles are small enough to be held in colloidal suspension.

24. A gas diffusion substrate according to claim 21, wherein the weight ratio of graphitic particles to carbon fibres is between 1:2 and 10:1.

25. A gas diffusion substrate according to claim 21, wherein the substrate has a gradient in the concentration of the graphitic particles and hydrophobic polymer across the thickness of the non-woven network.

26. A gas diffusion substrate according to claim 21, wherein the graphitic particles and hydrophobic polymer are homogeneously disposed within the fibre network.

27. A gas diffusion substrate according to claim 21, comprising a carbonised phenolic resin binder.

28. A gas diffusion substrate according to claim 21, wherein a base layer of carbon black and hydrophobic polymer is present on at least one face of the substrate.

29. A gas diffusion electrode comprising a gas diffusion substrate according to claim 22 and an electrocatalyst layer.

30. A gas diffusion electrode according to claim 29, wherein the substrate has a gradient in the concentration of the graphitic particles and hydrophobic polymer across the thickness of the non-woven network, wherein the electrocatalyst layer is adjacent to the face of the gas diffusion substrate and wherein there is a higher concentration of graphitic particles and hydrophobic polymer.

31. A membrane electrode assembly comprising a gas diffusion substrate according to claim 21.

32. A membrane electrode assembly comprising a gas diffusion electrode according to claim 29.

33. A process for preparing a gas diffusion substrate comprising the steps of:
   a) depositing a slurry of graphitised carbon fibres onto a porous bed to form a wet fibre network;
   b) preparing a suspension of graphitic particles and hydrophobic polymer, wherein the longest dimension of at least 90% of the graphitic particles is less than 100 µm;
   c) applying the suspension onto the wet fibre network;
   d) pulling the suspension into the wet fibre network; and
   e) drying and firing the network at a temperature that does not exceed 1000° C.;
wherein the gas diffusion substrate is according to claim 21.

34. A process for preparing a gas diffusion substrate comprising the steps of:
   a) mixing graphitic particles, wherein the longest dimension of at least 90% of the graphitic particles is between 100µm, with a suspension of hydrophobic polymer to form a first slurry;
   b) mixing graphitised carbon fibres and a liquid to form a second slurry;
   c) mixing the first slurry with the second slurry to form a third slurry;
   d) depositing the third slurry onto a porous bed to form a fibre-containing layer; and
   e) drying and firing the fibre-containing layer at a temperature that does not exceed 1000° C.;
wherein the gas diffusion substrate is according to claim 21.

* * * * *

UNITED STATES PATENT AND TRADEMARK OFFICE
CERTIFICATE OF CORRECTION

PATENT NO. : 8,133,306 B2
APPLICATION NO. : 11/629809
DATED : March 13, 2012
INVENTOR(S) : Quayle et al.

It is certified that error appears in the above-identified patent and that said Letters Patent is hereby corrected as shown below:

On the Title Page, Item [87], "PCT Pub. Date: December 29, 2008" should read --PCT Pub. Date: December 29, 2005--.

At column 9, line 19, claim 14

"A process for preparing a gas diffusion comprising"

should read

--A process for preparing a gas diffusion substrate comprising--,

At column 10, line 53, claim 34

"at least 90% of the graphitic particles is between"

should read

--at least 90% of the graphitic particles is less than--.

Signed and Sealed this
Nineteenth Day of March, 2013

Teresa Stanek Rea
*Acting Director of the United States Patent and Trademark Office*